(12) United States Patent
Boillot et al.

(10) Patent No.: US 7,283,892 B1
(45) Date of Patent: Oct. 16, 2007

(54) HYBRID COMPACT SENSING APPARATUS FOR ADAPTIVE ROBOTIC PROCESSES

(75) Inventors: Jean-Paul Boillot, Saint-Bruno (CA); Jean-Claude Fontaine, Sainte-Foy (CA)

(73) Assignee: Servo-Robot Inc., Quebec (CA)

( * ) Notice: Subject to any disclaimer, the term of this patent is extended or adjusted under 35 U.S.C. 154(b) by 0 days.

(21) Appl. No.: 11/730,694

(22) Filed: Apr. 3, 2007

(30) Foreign Application Priority Data

Apr. 3, 2006 (CA) .................................. 2541635

(51) Int. Cl.
*G06F 19/00* (2006.01)
(52) U.S. Cl. .................. 700/245; 700/259; 901/41; 901/42; 219/121.61; 219/121.62; 219/121.63; 219/121.64; 219/121.82
(58) Field of Classification Search ................. 700/259; 318/568.1, 568.11, 568.12, 568.18, 568.2; 901/41, 42; 219/121.61, 121.62, 121.63, 219/121.64, 121.82, 121.83
See application file for complete search history.

(56) References Cited

U.S. PATENT DOCUMENTS

| 4,532,404 A | * | 7/1985 | Boillot et al. .......... 219/124.34 |
| 5,612,785 A | * | 3/1997 | Boillot et al. ................ 356/623 |
| 6,352,354 B1 | * | 3/2002 | Boillot et al. ................ 362/253 |
| 6,992,455 B2 | * | 1/2006 | Kato et al. ............. 318/568.12 |

OTHER PUBLICATIONS

Zhang et al., Hybrid resistive tactile sensing, 2002, IEEE, p. 57-65.*
Tan et al., Integration of sensing, computation, communication and cooperation for distributed mobile sensor networks, 2003, IEEE, p. 54-59.*

* cited by examiner

*Primary Examiner*—Thomas Black
*Assistant Examiner*—McDieunel Marc
(74) *Attorney, Agent, or Firm*—Buchanan Ingersoll & Rooney PC

(57) ABSTRACT

A hybrid compact sensing apparatus for generating signals usable for guiding a process robot as a function of an object detected in a scene. The apparatus comprises a laser light generator, two optical sensors, one or more ultrasound sensors, and a control unit, all integrated in a same housing. The laser light generator and the optical sensors form a detection arrangement having a limited detection range compared to that of the ultrasound sensors. The control unit has a processing circuit monitoring the distance of the object measured by the ultrasound sensors, and triggering on the laser light generator and triggering use of the depth profile signals produced by the optical sensors among the signals usable for guiding the process robot when the distance measured by the ultrasound sensors falls within the limited detection range. Integration of an audio and video sensing unit to the apparatus enables remote monitoring.

20 Claims, 1 Drawing Sheet

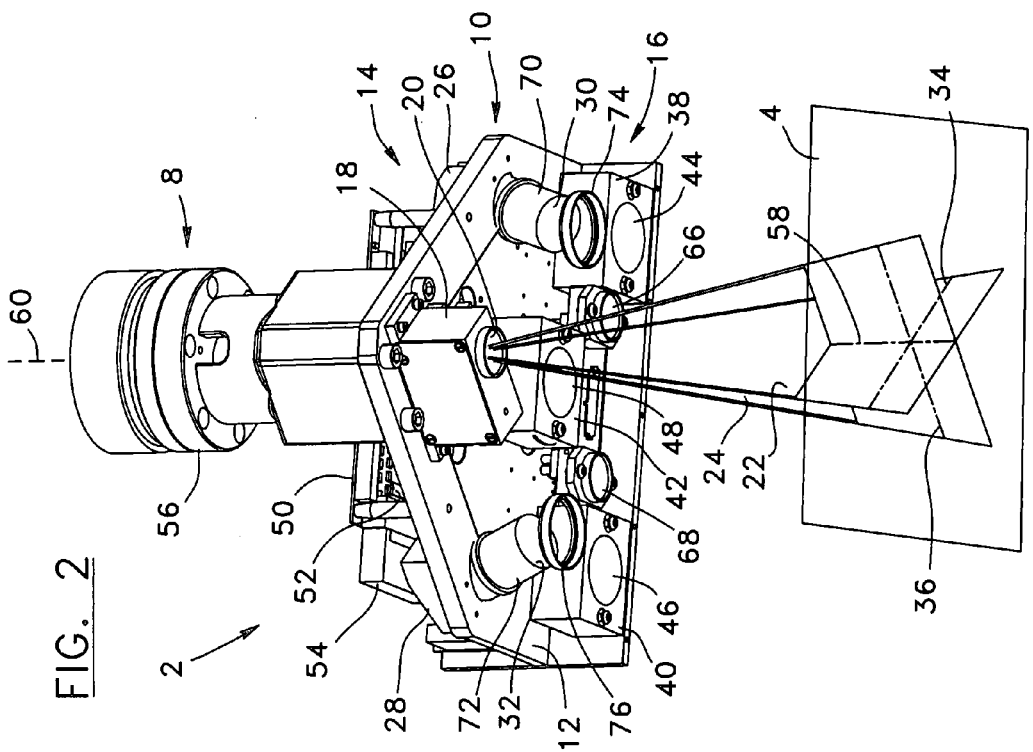
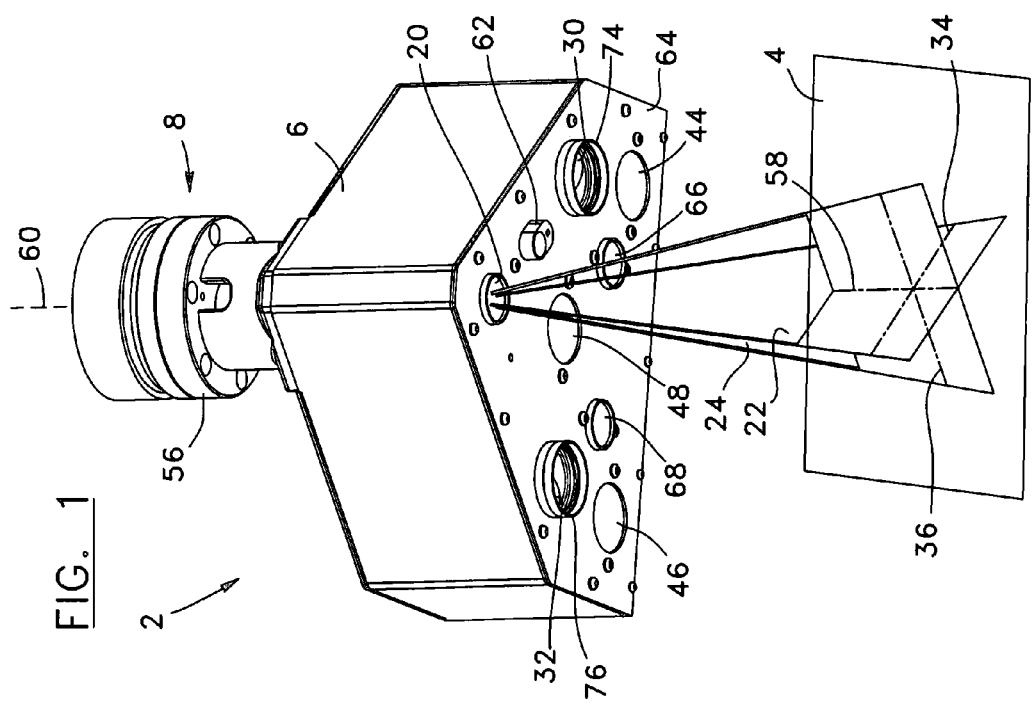

HYBRID COMPACT SENSING APPARATUS FOR ADAPTIVE ROBOTIC PROCESSES

FIELD OF THE INVENTION

The present invention relates to a hybrid compact sensing apparatus for generating signals usable for guiding a process robot as a function of an object detected in a scene, and a two-stage guiding process thereof.

BACKGROUND

Manufacturing or domestic tasks handled by robots require some degree of flexibility due to error in position/orientation of objects to be measured or handled to accomplish a given industrial or domestic task such as machine tending, loading, unloading, diecast handling, dimensional control, robot motion guidance robotic perception, etc.

Current robots can mostly rely on single sensors that are complicated to integrate into a manufacturing or handling operation and inefficient to provide the type of data required when objects must be located into an inaccurate and sometimes non-structured environment. Individual sensors must communicate together and interact with the robot controller to supply timely data used to control the robotic process in real time.

One major constraint is the difficulty to use robots to handle hazardous tasks otherwise done by humans. The use of multiple single sensors that are cumbersome requires complicated data processing and calibration thus making it difficult and sometimes impossible to apply them for locating, measuring, guiding, handling, etc.

SUMMARY

According to an aspect of the present invention, there is provided a hybrid compact sensing apparatus for generating signals usable for guiding a process robot as a function of an object detected in a scene, comprising:
  a housing attachable to the process robot and having a component mounting structure;
  a laser light generator mounted onto the component mounting structure of the housing and having a laser light output through the housing for controllable projection of at least two planes of laser light in a predetermined pattern towards the scene;
  two optical sensors mounted onto the component mounting structure of the housing and having optical inputs through the housing for detection of respective laser lines produced by intersection of the laser light with the object, and signal outputs producing depth profile signals indicative of a geometry of the object as a function of the detected laser lines, the laser light generator and the two optical sensors forming a detection arrangement having a first detection range limited by a field of view of the optical sensors and an effective range of the laser light generator;
  at least one ultrasound sensor mounted onto the component mounting structure of the housing and having an ultrasound transducer element through the housing for controllable emission of at least one ultrasound signal towards the scene within a second detection range substantially exceeding the first detection range and for reception of an echo signal returned by the object, and a signal output producing a measurement signal indicative of a distance of the object as a function of the detected echo signal; and
  a control unit connected to the laser light generator, the two optical sensors and the at least one ultrasound sensor, the control unit having a processing means monitoring the distance measured by the at least one ultrasound sensor as indicated by the measurement signal, providing the measurement signal as the signals usable for guiding the process robot, and triggering on the laser light generator and triggering use of the depth profile signals produced by the optical sensors among the signals usable for guiding the process robot when the distance measured by the at least one ultrasound sensor falls within the first detection range.

The control unit may comprise a circuit board mounted onto the component mounting structure of the housing, the processing means being mounted onto the circuit board.

According to another aspect of the present invention, there is provided a two-stage process for guiding a process robot as a function of an object detected in a scene, comprising the steps of:
  providing the process robot with a sensing apparatus comprising a laser light generator, two optical sensors, and at least one ultrasound sensor, all integrated in a same housing, the laser light generator and the two optical sensors forming a detection arrangement having a first detection range towards the scene limited by a field of view of the optical sensors and an effective range of the laser light generator, the at least one ultrasound sensor having a second detection range towards the scene substantially exceeding the first detection range;
  monitoring the scene with the at least one ultrasound sensor to detect presence and motion of the object and generating ultrasonic sensor data representative of a position of the detected object in the scene;
  measuring a distance of the detected object from the sensing apparatus using the ultrasonic sensor data;
  determining whether the measured distance falls within the first detection range;
  guiding the process robot as a function of the ultrasonic sensor data when the measured distance exceeds the first detection range;
  triggering on the detection arrangement formed of the laser light generator and the two optical sensors and generating laser range imaging data through the detection arrangement when the measured distance falls within the first detection range; and
  guiding the process robot as a function of the laser range imaging data when the measured distance is within the first detection range.

The present invention may be embodied in a compact construction comprising in a same housing or body all the necessary elements to perform detection and measurement of an object with multiple integrated optical and ultrasound sensors. This hybrid compact sensing apparatus enables the detection of an object's motion and direction and can perform precise measurement of the object's position/orientation and in particular instances, recognition and measurement of holes and other memorized geometric shapes for the purpose of robotic grabbing and verification. High intensity LED lamps may also be included to perform lighting of the scene and to facilitate digital 2D vision by integrated gray scale camera. Human monitoring can also be performed through integrated Webcam for video and audio monitoring of the scene by a distant operator or supervisor. Precision laser-range sensors can be used for measurement and scanning of the object including computation of the surface orientation at relatively short range while multiple ultrasound sensors may be used at longer range for measurement with less precision.

The present invention may also include the generation of audio signals to provide information to an operator about the distance to the object and its moving direction without looking at any monitor.

The hybrid compact sensing apparatus of the invention allows integrating in a single housing all the components required to detect an object at several meters away from the apparatus and to measure the position, orientation and dimension of the object in one single shot when the object comes into the laser range of the optical sensors, to illuminate the object and a surrounding area for 2D digital imaging, and to provide video and audio signals for monitoring the process remotely.

Orthogonal dual laser triangulation is preferably used for measurement of the object's position, orientation and geometry.

The center of optics of the laser sensing system is preferably coincident to the axis of a hollow shaft assembly that holds the sensing apparatus and which forms a gateway for power and data communication.

The hybrid compact sensing apparatus according to the invention also allows integrating in a single housing all the components required to detect the position, motion, direction of motion and accurately measure an object through ultrasonic sensors in precise geometric relationships with laser range images for control of robotic detection measurement and handling through functions of ultrasonic sensor data and laser range imaging data.

The hybrid compact sensing apparatus may have an auto-calibration system mode to instantaneously calibrate all the detectors and sensors of the hybrid sensing arrangement.

The hybrid compact sensing apparatus may be used to speed up the process robot toward the object when the object is within the ultrasonic detection long range and to initiate measurement by high precision laser range imager automatically when the object falls within the effective laser sensing range.

A variable pitch sound may be generated from each ultrasound sensor distance signal, with each audio signal having its own tone, and with frequency of each signal being proportional to an inverse value of the distance.

The above provides an outline of certain possibly preferable features of the invention which are to be considered non-restrictively and which will be more fully described hereinafter.

BRIEF DESCRIPTION OF THE DRAWINGS

A detailed description of preferred embodiments will be given herein below with reference to the following drawings, in which like numbers refer to like elements:

FIG. 1 is a perspective schematic view of the outside of the hybrid compact sensing apparatus.

FIG. 2 is a perspective schematic view of the inside of the hybrid compact sensing apparatus.

DETAILED DESCRIPTION OF THE PREFERRED EMBODIMENTS

Referring to FIGS. 1 and 2 there are respectively shown the outside and the inside of a hybrid compact sensing apparatus 2 according to the present invention, for generating signals usable for guiding a process robot (not shown in the Figures) as a function of an object 4 detected in a scene.

Although this disclosure refers to a process robot, it should be understood that the apparatus 2 may be attached to other types of carrier as well and that such other types of carrier are to be construed as being covered by or equivalent to the process robot.

Referring to FIG. 1, the apparatus 2 has a housing 6 having a side provided with an attachment 8 for connection of the housing 6 to the process robot.

Referring to FIG. 2, the housing 6 (shown in FIG. 1) has a component mounting structure 10, which may be formed of a mounting plate 12 dividing the housing 6 into rear and front opposite housing spaces 14, 16.

A laser light generator 18 is mounted onto the component mounting structure 10 and has a laser light output 20 through the housing 6 for controllable projection of at least two planes of laser light 22, 24 in a predetermined pattern towards the scene.

Two optical sensors 26, 28, for example possibly made of video cameras, CCD or CMOS imagers, or other imaging devices, are mounted onto the component mounting structure 10 and have optical inputs 30, 32 through the housing 6 for detection of respective laser lines 34, 36 produced by intersection of the laser light with the object 4, and signal outputs (not shown in the Figures) producing depth profile signals indicative of a geometry of the object 4 as a function of the detected laser lines 34, 36.

The laser light generator 18 and the two optical sensors 26, 28 form a detection arrangement having a first detection range limited by a field of view of the optical sensors 26, 28 and an effective range of the laser light generator 18.

The depth profile information in the signals from the optical sensors 26, 28 may be provided using the well-known optical triangulation principle or, depending on the light pattern, using the time of flight principle or other optical range measurement means or processes. This information can be used by an external image processor system (not shown) to compute object position and orientation instantaneously and for measurement and position detection of memorized shapes in a memorized library. Simplification of computation is achievable by the preferable perpendicular arrangement of the two laser planes 22, 24 and the laser lines 34, 36.

One or more ultrasound sensors 38, 40, 42 (there are three in the illustrated case) are mounted onto the component mounting structure 10. Each ultrasound sensor 38, 40, 42 has an ultrasound transducer element 44, 46, 48 through the housing 6 for controllable emission of an ultrasound signal towards the scene within a second detection range substantially exceeding the first detection range, and reception of an echo signal returned by the object 4. Each ultrasound sensor 38, 40, 42 has a signal output (not shown in the Figures) producing a measurement signal indicative of a distance of the object 4 as a function of the detected echo signal.

A control unit 50 is connected to the laser light generator 18, the two optical sensors 26, 28 and the ultrasound sensors 38, 40, 42. The control unit 50 has a processing circuit 52 monitoring the distance measured by the ultrasound sensors 38, 40, 42 as indicated by the measurement signals, providing the measurement signals as the signals usable for guiding the process robot, and triggering on the laser light generator 18 and triggering use of the depth profile signals produced by the optical sensors 26, 28 among the signals usable for guiding the process robot when the distance measured by the ultrasound sensors 38, 40, 42 falls within the first detection range. The control unit 50 may have a circuit board mounted onto the component mounting structure 10, with the processing circuit 52 mounted onto the circuit board. The control unit 50 may be entirely inside of the housing as illustrated, entirely outside of the housing 6, for example on or in the process robot, or distributed partly inside and partly outside of the housing 6 if desired.

The ultrasound sensors 38, 40, 42 are used to detect and measure the presence of objects up to several meters away. The ultrasound sensors 38, 40, 42 measure the distance between a detected object 4 and the apparatus 2. When the distance gets small enough for the object 4 to be detected by the optical sensors 26, 28, the apparatus 2 turns on the laser light generator 18 and starts to use the optical sensors 26, 28 to measure the distance of the object 4 with more accuracy. The ultrasound sensors 38, 40, 42 are used for long distance detection and possibly as a safety feature to allow the apparatus 2 to turn on the laser light generator 18 only when an object 4 is within the field of view of the optical sensors 26, 28.

The apparatus may be provided with a speaker circuit 54 mounted onto the component mounting structure 10 and connected to the control unit 50. The processing circuit 52 drives the speaker circuit 54 so that a remotely audible audio signal is produced as a function the distance measured by the ultrasound sensors 38, 40, 42 as indicated by the measurement signals. A variable pitch sound can thus be generated by the apparatus 2 to inform an operator about the distance of an object 4 detected by the ultrasound sensors 38, 40, 42.

The attachment 8 may be in the form of a hollow shaft assembly 56 attachable to a carrier such as a robot wrist or other appropriate parts of a process robot (or another type of equivalent carrier body or structure) and providing an inner wiring passage forming a gateway for power and data communication between the process robot and the apparatus 2. The hollow shaft assembly 56 is preferably adapted to fit standard robot wrist or machine (not shown), the inner wiring passage then enabling internal cable layout to power the apparatus 2 and to transmit electronic data.

The two planes of laser light 22, 24 preferably have an axis 58 coincident with an axis 60 of the hollow shaft assembly 56. Thus, when the apparatus 2 is attached to a robot wrist, a simple rotation of the robot wrist will rotate the crosswise laser light lines 34, 36 around their crossing point on the object 4. The laser light generator 18 preferably projects the two planes of laser light 22, 24 at a 90° angle (perpendicular) with respect to each other. Additional planes of laser light or other projection patterns may be produced by the laser light generator 18 and used if desired.

Referring to FIG. 1, the apparatus 2 may further have a video sensing module 62, for example formed of a video camera unit, mounted onto the mounting structure 10 (shown in FIG. 2) of the housing 6 or, as in the illustrated case, on a cover plate 64 of the housing 6 forming in that case a part of the component mounting structure 10. The video sensing module 62 is arranged to have a field of view directed on the scene for producing a video image signal of the scene. One or more light sources 66, 68 (two in the illustrated case, and preferably high intensity light sources) may be mounted onto the component mounting structure 10 for illumination of the scene to be captured by the video sensing module 62. The light sources 66, 68 are preferably formed of light emitting diodes (LEDs) producing light beams directed towards the scene, but other types of light sources may be used if desired to provide the required illumination for the video sensing module 62.

The video sensing module 62 preferably has a microphone for sound detection, monitoring or transmission purposes, thereby allowing remote video and audio surveillance of the work area. The microphone may be separate from the video sensing module 62 if desired.

The cover plate 64 exhibits multiple orifices for the laser light output 20, the optical inputs 30, 32 and the ultrasound transducer elements 44, 46, 48. Additional orifices may be provided in the cover plate 64 for the light sources 66, 68 and other components if any. The laser light output 20, the optical inputs 30, 32 and the ultrasound transducer elements 44, 46, 48 may extend fairly or exactly in a same plane defined by the cover plate 64 of the housing 6 as shown. However, other arrangements may be used if more appropriate to the models of the components assembled in the apparatus 2. The cover plate 64 may be assembled to form a pressurized front end for protection from ambient and possibly harsh environment.

Referring again to FIG. 2, the measurement signals produced by the ultrasound sensors 38, 40, 42 may be in analog form while the depth profile signals produced by the optical sensors 26, 28 may be in a form of digital video signals. In such a case, the processing circuit 52 of the control unit 50 may be configured to convert the measurement signals into digital values, to compare the digital values to a threshold value, to control operation of the laser light generator 18 in response to a comparison result between the digital and threshold values, to receive the video signals from the optical sensors 26, 28, to process the video signals, to control operation of the optical sensors 26, 28 and the ultrasound sensors 38, 40, 42, and to communicate with the process robot for process control purposes. The processing circuit 52 may conveniently include a processor executing an appropriate program.

The remotely audible audio signals produced by the ultrasound sensors 38, 40, 42 may have a different tone for each one of the ultrasound sensors 38, 40, 42, modulated with frequency inversely proportional to the distance measured by the corresponding one of the ultrasound sensors 38, 40, 42.

The two optical sensors 26, 28 are preferably provided with respective focusing lenses 70, 72 directed toward the scene and having field of views covering the first detection range. The two optical sensors 26, 28 and the control unit 50 may extend in the rear housing space 14 while the laser light generator 18, the ultrasound sensor 38, 40, 42 and the focusing lens 70, 72 may extend in the front housing space 16. The focusing lenses 70, 72 (shown in FIG. 2) are preferably provided with protective lenses 74, 76 on a side of the scene.

The processing circuit 52 may comprise an autocalibration mode or procedure establishing a common reference for the ultrasound sensors 38, 40, 42 and the optical sensors 26, 28. The autocalibration mode may be effected by determining a relation between a coordinate system of the ultrasound sensors 38, 40, 42 and a coordinate system of the optical sensors 26, 28 from distance measurements taken with the ultrasound sensors 38, 40, 42 and the optical sensors 26, 28 for a target object (not shown) positioned in the scene within the first detection range, i.e. in the field of view of the optical sensors 26, 28. The target object preferably has a flat surface positioned perpendicular to the common axis 58 of the laser light planes 22, 24.

The laser light generator 18, the two optical sensors 26, 28 and the ultrasound sensors 38, 40, 42 are preferably all positioned in a symmetrical arrangement with respect to a central transverse axis of the housing 6 (shown in FIG. 1), orthogonal to the axis 60 of the attachment 8, as in the illustrated case. The elements of the apparatus 2 are preferably arranged in a most compact way to detect and measure an object 4 through a combination of sensing data. The apparatus 2 may communicate through a network (not shown) to generate ready-to-use data for the robot at process speed.

In a possible and non-limitative mode of operation of the apparatus 2 where the ultrasound sensors 38, 40, 42 directly provide analog signals that are proportional to the distance of the detected object 4, the analog signals are converted to digital values by the control unit 50 preferably inside the apparatus 2. The control unit 50 also controls the laser light generator 18. The optical sensors 26, 28 output video signals in a digital format that are fed to the control unit 50. In the case where the processing circuit 52 of the control unit 50 is embodied by a processor, the processor executes a program to receive the data from the ultrasound sensors 38, 40, 42 and the optical sensors 26, 28, to process them, to control the operation of the sensors 38, 40, 42, 26, 28 and to communicate with an external manipulator (not shown) for process control. While an object 4 is detected by the ultrasound sensors 38, 40, 42, the processor drives the speaker 54 with a signal that contains a different tone for each ultrasound sensor 38, 40, 42, each tone being modulated with frequency inversely proportional to the distance. When the control unit 50 detects that an object 4 observed by the ultrasound sensors 38, 40, 42 gets within the field of view of the optical sensors 26, 28, it can turn on the laser light generator 18 to detect the object 4 more accurately with the optical sensors 26, 28.

A two-stage process for guiding the process robot as a function of the object 4 detected in the scene may be performed with the apparatus 2 by monitoring the scene with the ultrasound sensors 38, 40, 42 to detect presence and motion of the object 4 and generate ultrasonic sensor data representative of a position of the object 4 in the scene, by measuring a distance of the object 4 from the sensing apparatus 2 using the ultrasonic sensor data, and by determining whether the measured distance falls within the first detection range. When the measured distance exceeds the first detection range, the process performs the step of guiding the process robot as a function of the ultrasonic sensor data (first stage). When the measured distance falls within the first detection range, the process performs the steps of triggering on the detection arrangement formed of the laser light generator 18 and the two optical sensors 26, 28 and generating laser range imaging data through the detection arrangement, the process robot being then guided as a function of the laser range imaging data (second stage).

The process may further include the steps of speeding up the process robot towards the detected object when the measured distance exceeds the first detection range, and triggering the detection arrangement in operation when the measured distance falls within the first detection range.

While embodiments of this invention have been illustrated in the accompanying drawings and described above, it will be evident to those skilled in the art that changes and modifications may be made therein without departing from the essence of this invention.

The invention claimed is:

1. A hybrid compact sensing apparatus for generating signals usable for guiding a process robot as a function of an object detected in a scene, comprising:
   a housing attachable to the process robot and having a component mounting structure;
   a laser light generator mounted onto the component mounting structure of the housing and having a laser light output through the housing for controllable projection of at least two planes of laser light in a predetermined pattern towards the scene;
   two optical sensors mounted onto the component mounting structure of the housing and having optical inputs through the housing for detection of respective laser lines produced by intersection of the laser light with the object, and signal outputs producing depth profile signals indicative of a geometry of the object as a function of the detected laser lines, the laser light generator and the two optical sensors forming a detection arrangement having a first detection range limited by a field of view of the optical sensors and an effective range of the laser light generator;
   at least one ultrasound sensor mounted onto the component mounting structure of the housing and having an ultrasound transducer element through the housing for controllable emission of at least one ultrasound signal towards the scene within a second detection range substantially exceeding the first detection range and for reception of an echo signal returned by the object, and a signal output producing a measurement signal indicative of a distance of the object as a function of the detected echo signal; and
   a control unit connected to the laser light generator, the two optical sensors and the at least one ultrasound sensor, the control unit having a processing means monitoring the distance measured by the at least one ultrasound sensor as indicated by the measurement signal, providing the measurement signal as the signals usable for guiding the process robot, and triggering on the laser light generator and triggering use of the depth profile signals produced by the optical sensors among the signals usable for guiding the process robot when the distance measured by the at least one ultrasound sensor falls within the first detection range.

2. The hybrid compact sensing apparatus according to claim 1, wherein the control unit comprises a circuit board mounted onto the component mounting structure of the housing, the processing means being mounted onto the circuit board.

3. The hybrid compact sensing apparatus according to claim 2, wherein:
   the component mounting structure comprises a mounting plate dividing the housing into rear and front opposite housing spaces;
   the two optical sensors are provided with respective focusing lenses directed toward the scene and having field of views covering the first detection range;
   the two optical sensors and the circuit board extend in the rear housing space; and
   the laser light generator, the at least one ultrasound sensor, and the focusing lens extend in the front housing space.

4. The hybrid compact sensing apparatus according to claim 1, further comprising a speaker circuit mounted onto the component mounting structure of the housing and connected to the control unit, wherein the processing means of the control unit drives the speaker circuit so that a remotely audible audio signal is produced as a function the distance measured by the at least one ultrasound sensor as indicated by the measurement signal.

5. The hybrid compact sensing apparatus according to claim 4, wherein:
   the at least one of the ultrasound sensor comprises multiple ultrasound sensors; and
   the remotely audible audio signal comprises a different tone for each one of the ultrasound sensors, modulated with frequency inversely proportional to the distance measured by a corresponding one of the ultrasound sensors.

6. The hybrid compact sensing apparatus according to claim 1, wherein the housing is provided with a hollow shaft assembly attachable to the process robot and providing an inner wiring passage forming a gateway for power and data communication between the process robot and the hybrid compact sensing apparatus.

7. The hybrid compact sensing apparatus according to claim 6, wherein the at least two planes of laser light have an axis coincident with an axis of the hollow shaft assembly.

8. The hybrid compact sensing apparatus according to claim 1, wherein the at least two planes of laser light comprise two planes of laser light perpendicular with respect to each other.

9. The hybrid compact sensing apparatus according to claim 1, further comprising a video sensing module mounted onto the component mounting structure of the housing and having a field of view directed on the scene for producing a video image signal of the scene, and at least one light source mounted onto the component mounting structure of the housing for illumination of the scene to be captured by the video sensing module.

10. The hybrid compact sensing apparatus according to claim 9, wherein the at least one light source comprises light emitting diodes.

11. The hybrid compact sensing apparatus according to claim 9, further comprising a microphone mounted onto the component mounting structure of the housing, for detecting ambient sound.

12. The hybrid compact sensing apparatus according to claim 1, wherein:
the measurement signal produced by the at least one ultrasound sensor is in analog form;
the depth profile signals produced by the optical sensors are in a form of digital video signals; and
the processing means of the control unit converts the measurement signal into a digital value, compares the digital value to a threshold value, controls operation of the laser light generator in response to a comparison result between the digital and threshold values, receives the video signals from the optical sensors, processes the video signals, controls operation of the optical sensors and the at least one ultrasound sensor, and communicates with the process robot for process control.

13. The hybrid compact sensing apparatus according to claim 1, wherein the housing has a cover plate having multiple orifices for the laser light output of the laser light generator, the optical inputs of the optical sensors and the ultrasound transducer element of the at least one ultrasound sensor.

14. The hybrid compact sensing apparatus according to claim 1, wherein the laser light output, the optical inputs and the ultrasound transducer element substantially extend in a same plane.

15. The hybrid compact sensing apparatus according to claim 1, wherein the processing means of the control unit comprises an autocalibration means establishing a common reference for the at least one ultrasound sensor and the optical sensors.

16. The hybrid compact sensing apparatus according to claim 15, wherein the autocalibration means is effected by determining a relation between a coordinate system of the at least one ultrasound sensor and a coordinate system of the optical sensors from distance measurements taken by the at least one of the ultrasound sensor and the optical sensors for a target object positioned in the scene within the first detection range.

17. The hybrid compact sensing apparatus according to claim 16, wherein the target object has a flat surface positioned perpendicular to a common axis of the planes of laser light.

18. The hybrid compact sensing apparatus according to claim 1, wherein the laser light generator, the two optical sensors and the at least one ultrasound sensor are all positioned in a symmetrical arrangement with respect to a central transverse axis of the housing.

19. A two-stage process for guiding a process robot as a function of an object detected in a scene, comprising the steps of:
providing the process robot with a sensing apparatus comprising a laser light generator, two optical sensors, and at least one ultrasound sensor, all integrated in a same housing, the laser light generator and the two optical sensors forming a detection arrangement having a first detection range towards the scene limited by a field of view of the optical sensors and an effective range of the laser light generator, the at least one ultrasound sensor having a second detection range towards the scene substantially exceeding the first detection range;
monitoring the scene with the at least one ultrasound sensor to detect presence and motion of the object and generating ultrasonic sensor data representative of a position of the detected object in the scene;
measuring a distance of the detected object from the sensing apparatus using the ultrasonic sensor data;
determining whether the measured distance falls within the first detection range;
guiding the process robot as a function of the ultrasonic sensor data when the measured distance exceeds the first detection range;
triggering on the detection arrangement formed of the laser light generator and the two optical sensors and generating laser range imaging data through the detection arrangement when the measured distance falls within the first detection range; and
guiding the process robot as a function of the laser range imaging data when the measured distance is within the first detection range.

20. The two-stage process according to claim 19, further comprising the steps of speeding up the process robot towards the detected object when the measured distance exceeds the first detection range, and triggering the detection arrangement in operation when the measured distance falls within the first detection range.

* * * * *